US012748318B2

(12) United States Patent
Culpepper

(10) Patent No.: US 12,748,318 B2
(45) Date of Patent: Sep. 29, 2026

(54) MODULAR AND ADJUSTABLE EYEGLASSES FOR UNIVERSAL FITMENT

(71) Applicant: Eyesight Concepts, LLC, Macon, GA (US)

(72) Inventor: Lachionté Culpepper, Ellenwood, GA (US)

(73) Assignee: Eyesight Concepts, LLC, Macon, GA (US)

( * ) Notice: Subject to any disclaimer, the term of this patent is extended or adjusted under 35 U.S.C. 154(b) by 320 days.

(21) Appl. No.: 18/512,391

(22) Filed: Nov. 17, 2023

(65) Prior Publication Data

US 2024/0310650 A1 Sep. 19, 2024

Related U.S. Application Data

(60) Provisional application No. 63/452,602, filed on Mar. 16, 2023.

(51) Int. Cl.
*G02C 5/04* (2006.01)
*G02C 5/20* (2006.01)

(52) U.S. Cl.
CPC ............... *G02C 5/045* (2013.01); *G02C 5/20* (2013.01)

(58) Field of Classification Search
None
See application file for complete search history.

(56) References Cited

U.S. PATENT DOCUMENTS

| | | | | |
|---|---|---|---|---|
| 1,289,998 | A * | 12/1918 | Yassukovitch | G02C 3/003 2/452 |
| 2013/0235327 | A1* | 9/2013 | Atkinson | G02C 5/2209 351/116 |
| 2015/0146157 | A1* | 5/2015 | Tipp | G02C 11/02 351/52 |
| 2015/0168741 | A1* | 6/2015 | Esmaeili | G02C 5/20 351/115 |
| 2020/0278563 | A1* | 9/2020 | Shalon | G02C 5/20 |
| 2021/0041723 | A1* | 2/2021 | Hikosaka | G02C 13/001 |
| 2021/0240006 | A1* | 8/2021 | Rojas | G02C 5/20 |
| 2022/0357596 | A1* | 11/2022 | Wolowiec | G02C 9/04 |

FOREIGN PATENT DOCUMENTS

| | | | | |
|---|---|---|---|---|
| IN | 27915 B | * | 5/2016 | |
| WO | WO-2020210884 A1 | * | 10/2020 | G02C 5/12 |
| WO | WO-2021136613 A1 | * | 7/2021 | G02C 5/126 |
| WO | WO-2022187394 A1 | * | 9/2022 | G02C 1/00 |

* cited by examiner

*Primary Examiner* — Sharrief I Broome
*Assistant Examiner* — Journey F Sumlar
(74) *Attorney, Agent, or Firm* — Wiggin and Dana LLP

(57) ABSTRACT

The present disclosure provides for universally-fitting prescription eyeglasses and kits and methods of use thereof. The prescription eyeglasses advantageously provide for one or more of an adjustable width, and adjustable interpupillary distance, and adjustable temple lengths. In various embodiments, the adjustable eyeglasses may provide for asymmetric arrangements of components for users having asymmetric facial features. The adjustable eyeglasses can accommodate lenses of varying prescription and kits may include sets of replaceable lenses to accommodate prescription needs for patients without lengthy custom lens fitting.

20 Claims, 6 Drawing Sheets

FIG. 2A
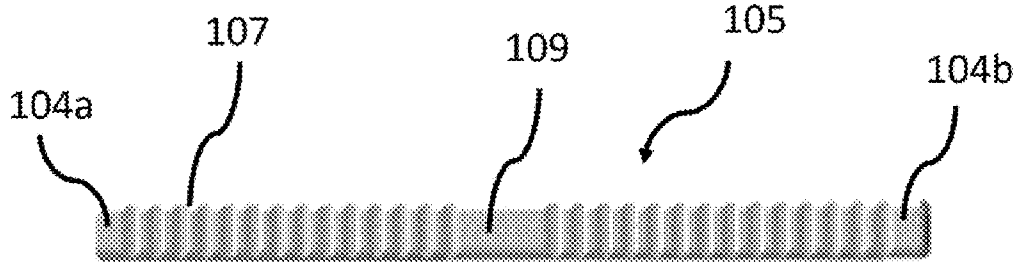
FIG. 2B
FIG. 2

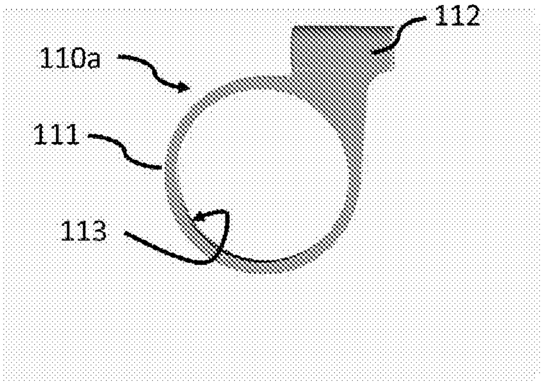
FIG. 3A
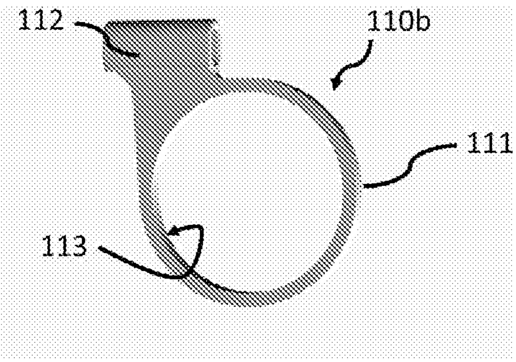
FIG. 3C
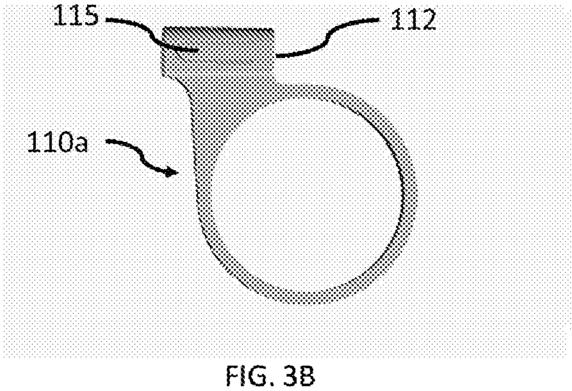
FIG. 3B
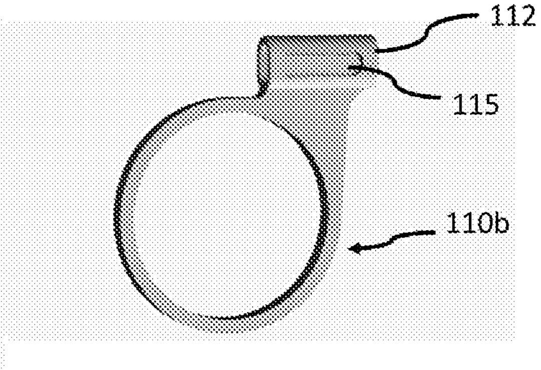
FIG. 3D
FIG. 3

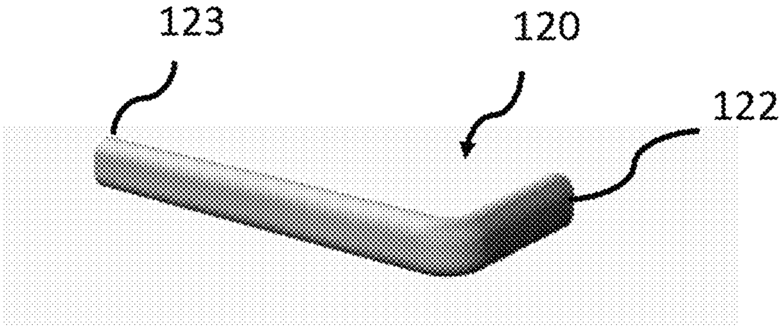
FIG. 4A
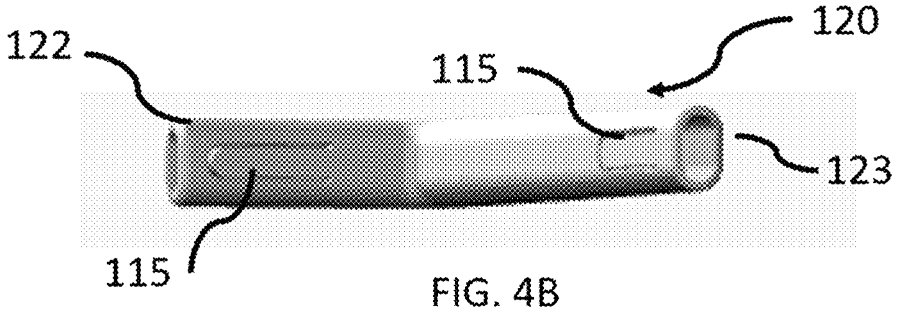
FIG. 4B
FIG. 4

MODULAR AND ADJUSTABLE EYEGLASSES FOR UNIVERSAL FITMENT

CROSS-REFERENCE TO RELATED APPLICATION

This application claims priority to U.S. Provisional Patent Application No. 63/452,602, filed Mar. 16, 2023, which is incorporated by reference herein in its entirety.

TECHNICAL FIELD

The present disclosure provides for adjustable prescription eyeglasses and kits and methods of use thereof. The prescription eyeglasses advantageously provide for one or more of an adjustable width, and adjustable interpupillary distance, and adjustable temple lengths. In various embodiments, the adjustable eyeglasses may provide for asymmetric arrangements of components for users having asymmetric facial features. The adjustable eyeglasses can accommodate lenses of varying prescription and kits may include sets of replaceable lenses to accommodate prescription needs for patients without lengthy and costly custom lens fitting.

BACKGROUND

Over 60% of the population require corrective lenses for nearsightedness and/or farsightedness. The most popular option for vision correction is wearing eyeglasses which position prescription lenses in front of the wearer's eyes. However, the time from which a wearer receives a prescription from their optometrist during an eye exam, to which the wearer actually receives their finished glasses, can range from weeks to a month or more. During this period of time, eyeglass wearers have no choice but to wear their old prescription despite it being potentially unsafe and unhealthy for their eyes. Even worse, if their glasses have been broken or misplaced, there are no options for temporary glasses that match the wearer's correct prescription. Eyeglass wearers are simply told to hold onto their old, previous frames and lenses in case they need them, despite the safety and health risk issues associated with using an outdated prescription.

Therefore, there is great need for a universal solution to provide eyeglass wearers with temporary, properly fitting glasses matching their current prescription during the period of time from which their prescription is issued to when their finished eyeglasses arise. Furthermore, such universal and temporary glasses may be useful while the wearer requires repairs to their eyeglasses or replacement of broken eyeglasses/lenses. This solution comes with several challenges. Properly-fitting eyeglass lenses require a certain temple length and a certain width to fit a wearer's face/head. Normally, wearers find frames which fit them by trial-and-error and assistance by fitment specialists. Moreover, the frames must support an appropriate interpupillary distance (ID) to ensure that the lenses can be manufactured to correctly center them over each eye of the wearer. The lenses must then be manufactured according to the user's prescription and ID. Finally, once the frames have been fitted with the manufactured lenses, the wearer must have the frames professionally adjusted by a fitment specialist to ensure that they fit correctly.

Provided herein is a temporary, universal solution overcoming these challenges in the form of cost-effective and modular adjustable eyeglasses. The adjustable eyeglasses may include an adjustable interpupillary distance and adjustable temple lengths, among other adjustment features for proper fitment on all wearers. Additionally, lens frame portions of the adjustable eyeglasses may be designed to universally accept universal lenses over a wide range of prescriptions, meaning that pre-manufactured lenses matching the user's prescription may be inserted for immediate use. Importantly, the solutions herein do not require tools or professional fitment specialists because they are designed for adjustable yet secure fitment. In some cases, these features may be incorporated in non-temporary eyeglasses for people with rapidly-changing prescriptions, including growing children, or adults with disease. The solutions provided herein will therefore provide eyeglasses wearers with a safe, well-fitting, and healthy solution for immediately wearable prescription eyeglasses.

SUMMARY

The disclosure generally relates to adjustable prescription eyeglasses for universal fitment. The following embodiments will become clear from the disclosure herein, and further embodiments within the spirit and scope of the disclosure are contemplated.

In an embodiment, the present disclosure provides for adjustable eyeglasses, comprising:

a bridge bar for receiving a left lens support and a right lens support, the left lens support and right lens support slidably engageable with the bridge bar, the left lens support and right lens support each having a lens frame portion and a bar engagement portion, and wherein each bar engagement portion includes an adjustable securement mechanism to adjustably position the left lens support and the right lens support each at a different one of a plurality of pre-defined positions along the bridge bar to set an overall lens position and interpupillary distance of the adjustable eyeglasses;

a left angular connector and a right angular connector, the left angular connector and the right angular connector each having a bar engagement end and a temple engagement end, a respective bar engagement end arranged at a pre-defined angle relative to a respective temple engagement end, wherein each bar engagement end includes an adjustable securement mechanism for adjustable securement of respective ends of the bridge bar at one of a plurality of pre-defined insertion depths into the respective left angular connector and respective right angular connector to set an overall width of the adjustable eyeglasses;

a left temple arm and a right temple arm, the left temple arm and the right temple arm each having an ear-retaining end and an insertion end, the ear-retaining ends of the left temple arm and the right temple arm having an overall arcuate shape to provide ear securements, wherein the temple engagement ends of the respective left angular connector and right angular connector include an adjustable securement mechanism for adjustable securement of respective insertion ends of the left temple arm and right temple arm each at one of a plurality of pre-defined insertion depths into the left angular connector and right angular connector to set left and right temple lengths for the adjustable eyeglasses.

In an embodiment, the lens frame portions are circular and have an inner surface circumferentially engageable with an outer circumference of a circular lens In an embodiment, the bridge bar includes one or more regions of ridged features.

In an embodiment, the bar engagement portions of the left lens support and right lens support each include an articulating flap member formed as a portion of the respective bar engagement portion, the articulating flap members each including an interior ridged feature complementary to the one or more regions of ridged features of the bridge bar.

In an embodiment, the complementary feature of the articulating flap member is releasably and adjustably engageable with the one or more regions of ridged features of the bridge bar to releasably secure the respective bar engagement portion at a position along the bridge bar.

In an embodiment, the bar engagement ends of the left angular connector and right angular connector each include an articulating flap member formed as a portion of the respective bar engagement end, the articulating flap members each including an interior ridged feature complementary to the one or more regions of ridged features of the bridge bar ends.

In an embodiment, the complementary feature of the articulating flap member is releasably and adjustably engageable with the one or more regions of ridged features of the bridge bar ends to releasably secure the respective bar engagement end of the respective angular connector at an insertion depth of the bridge bar end.

In an embodiment, the temple engagement ends of the left angular connector and right angular connector each include an articulating flap member formed as a portion of the respective temple engagement end, the articulating flap members each including an interior ridged feature complementary to one or more regions of ridged features of the temple arms.

In an embodiment, the complementary feature of the articulating flap member is releasably and adjustably engageable with the one or more ridged features of the temple arms to releasably secure the respective temple engagement end of the respective angular connector at an insertion depth of the temple arm In an embodiment, the inner surface of the lens frame portions and outer circumference of the circular lenses are substantially smooth and engage by friction.

In an embodiment, the respective bar engagement end and temple engagement end of each angular connector are arranged at a pre-defined angle of approximately 75-105 degrees In an embodiment, the pre-defined angle is approximately 90 degrees.

In an embodiment, the lens frame portions are independently configured to support lenses, each lens having a prescription in a range from about −10 to +8.

In an embodiment, the adjustable eyeglasses do not have temple hinges.

In an embodiment, the adjustable eyeglasses do not have nose pads.

In an embodiment, the adjustable eyeglasses are constructed entirely from plastic and contain no metal.

In an embodiment, the left and right temple lengths have a range from about 100 mm to about 170 mm.

In further embodiments, the present disclosure provides for adjustable eyeglasses, comprising:

- a left lens support adjustably coupled to a right lens support by a bridge adjustment mechanism, wherein the bridge adjustment mechanism secures the left lens support at an adjustable distance to the right lens support to set the interpupillary distance and overall width of the eyeglasses;
- a left temple arm receiving portion and a right temple arm receiving portion, the left temple arm receiving portion and right temple arm receiving portion coupled to the respective left lens support and right lens support at a pre-defined angle;
- a left temple arm and a right temple arm, the left temple arm and the right temple arm each having an ear-retaining end and an insertion end, the ear-retaining ends of the left temple arm and the right temple arm having an overall arcuate shape to provide ear securements,
- wherein the temple engagement ends of the respective left temple arm receiving portion and right temple arm receiving portion include an adjustable securement mechanism for adjustable securement of respective insertion ends of the left temple arm and right temple arm each at one of a plurality of pre-defined insertion depths into the respective left temple arm receiving portion and right temple arm receiving portion to set left and right temple lengths for the adjustable eyeglasses.

In an embodiment, the lens frame portions are circular and have an inner surface circumferentially engageable with an outer circumference of a circular lens, and wherein the inner surface of the lens frame portions and outer circumference of the circular lenses are substantially smooth and engage by friction.

In an embodiment, the left temple arm receiving portion and right temple arm receiving portion are of a unitary body with the respective left lens support and right lens support.

BRIEF DESCRIPTION OF THE DRAWINGS

Aspects and advantages of the present disclosure will become apparent from the following exemplary embodiments taken in conjunction with the accompanying drawings, of which:

FIG. 2A depicts a front perspective view of an exemplary bridge bar;

FIG. 2B depicts a rear perspective view of an exemplary bridge bar;

FIGS. 3A-3B depict, respectively, front and rear views of an exemplary right lens support;

FIGS. 3C-3D depict, respectively, front and rear views of an exemplary left lens support;

FIGS. 4A-4B depict, respectively, first and second side perspective views of an exemplary angular connector;

DETAILED DESCRIPTION

The embodiments described herein relate to adjustable eyeglasses for temporary and/or universal use. While certain embodiments are described, it should be appreciated that additional embodiments providing the same or similar functionality are likewise contemplated by the disclosure.

In various embodiments, the adjustable eyeglasses will include a mechanism for adjusting the position of one lens frame portion relative to another lens frame portion for adjusting the interpupillary distance of the eyeglasses. The mechanism may adjust only the lens positions or may also adjust the overall width of the eyeglasses as described herein. A lens frame portion generally retains a lens and may include one or more other features for providing adjustability of the eyeglasses. The lens frame portion, and any other portion of the adjustable eyeglasses herein, may be formed of a single material (i.e. of a unitary body), or may include one or more pieces of the same or different material coupled or connected by way of adhesives, fasteners, complementary engaging features, or any other mechanism. In various embodiments, portions of the adjustable eyeglasses may be formed of a plastic material. Plastic portions may be formed by 3D printing, injection molding, machining, and combinations thereof, or by any other viable method. In some embodiments, one or more portions may include a non-plastic material such as a metal. In view of cost, most preferred are adjustable eyeglasses constructed mostly or fully from a plastic.

Lenses may likewise be manufactured from any material including plastics, resins, acrylics, or glass. In various embodiments, the overall dimensions of the lens supports may be modified to accommodate lenses of various prescriptions. In some embodiments, the lenses each have a prescription ranging from about −10 to +8.

Figure 1A:
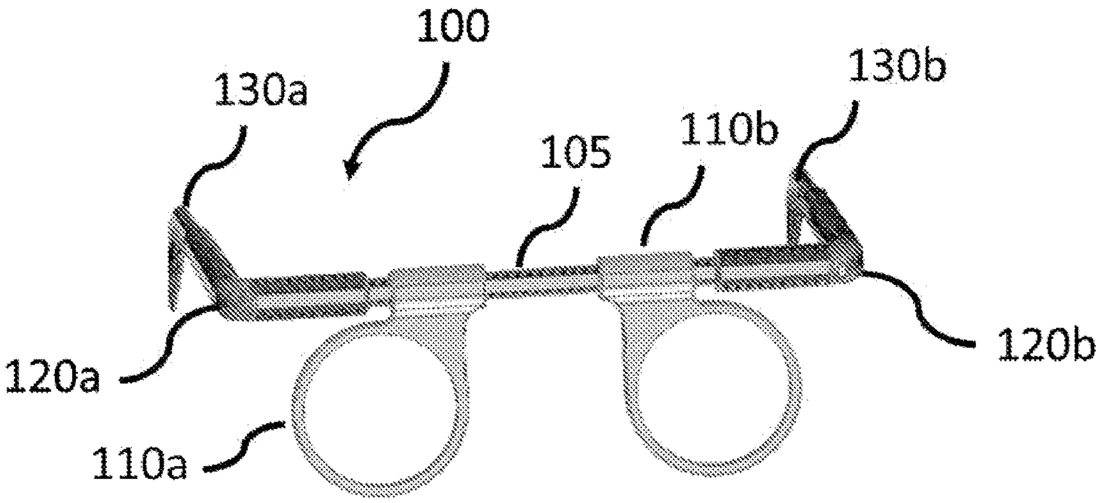
FIG. 1A depicts a front perspective view of exemplary adjustable eyeglasses.
Figure 1B:
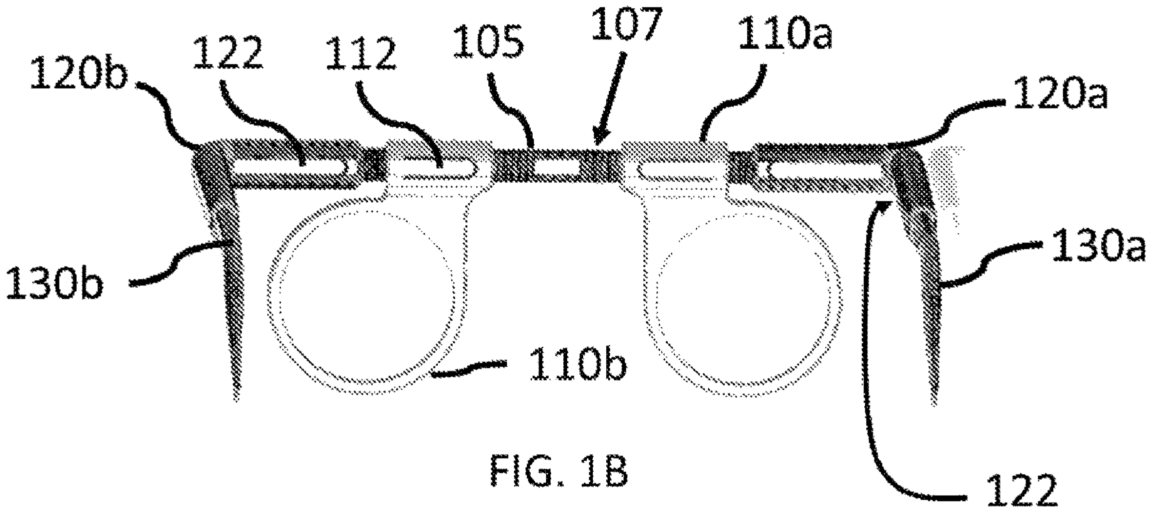
FIG. 1B depicts a rear perspective view of exemplary adjustable eyeglasses.
Figure 5:
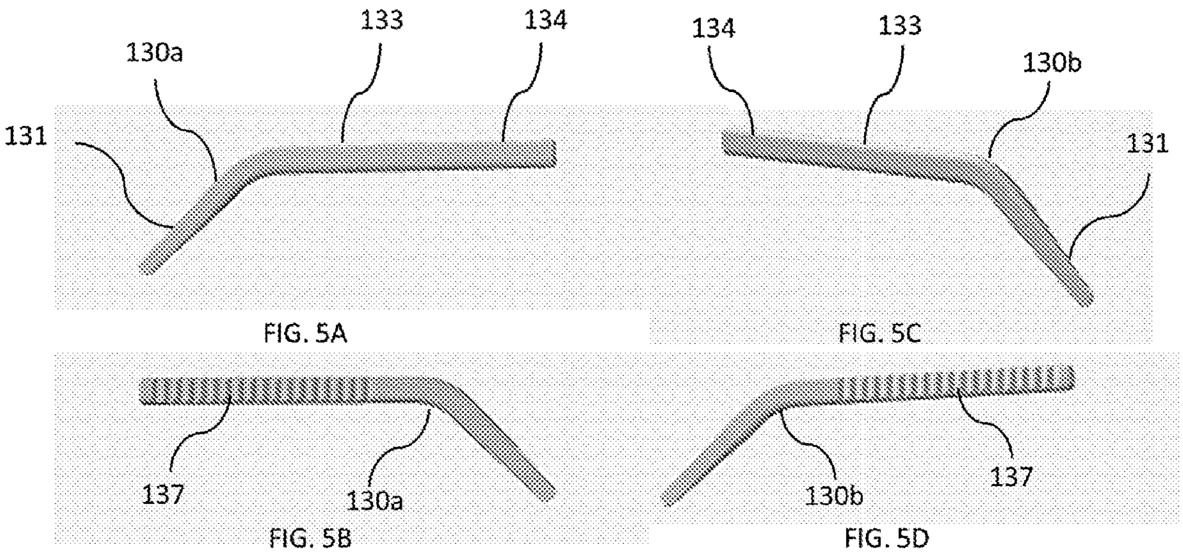
FIGS. 5A-5B depict, respectively, first and second side perspective views of an exemplary right temple arm.
FIGS. 5C-5D depict, respectively, first and second side perspective views of an exemplary left temple arm.

An exemplary embodiment of adjustable eyeglasses is depicted in FIG. 1A-1B. In the front perspective view of FIG. 1A, and rear perspective view of FIG. 1B, the adjustable eyeglasses 100 are shown in an assembled state, with seven pieces slidably engaged in a particular fitment arrangement. The positions of the pieces may be changed relative to one another over a wide range of positions to provide universal fitment to various wearers. Starting from a front of the eyeglasses, the bridge bar 105 provides for slidable engagement of the two lens supports 110*a* and 110*b*. As can be seen from FIG. 1A, the lens supports may be slidably adjusted along the bridge bar until they abut each other, or until they abut the angular connectors 120*a* and 120*b* which cap the bridge bar 105. It should be appreciated that if a wider range of motion of the lens supports 110*a* and 110*b* is desired, the bar engaging portions 112 of the lens supports 110*a* and 110*b* can be modified in their dimensions and the angular connectors 120*a*, 120*b* can likewise be modified if necessary. As will be further described, the lens supports 110*a*, 110*b* generally include a lens frame portion for holding a lens. The lens supports 110*a*, 110*b* may have a same shape or may have a different shape such as mirror images of each other as shown in FIGS. 1A and 1B.

The bar engaging portion 112 of the lens supports 110*a*, 110*b* may engage with the bridge bar 105 in any manner so as to secure it in one or more positions along the bridge bar 105. In an embodiment, the bridge bar 105 includes one or more regions of ridged features 107 which may engage with a complementary feature of the bar engaging portion 112. The angular connectors 120*a* and 120*b* may also engage with the bridge bar 105 ends in any manner so as to secure them in one or more positions along the bridge bar 105 ends. In an embodiment, the bridge bar includes ridged features 107 at its ends which may engage with complementary features of the bar end engaging portion 122 of the angular connectors 120*a*, 120*b*.

The adjustable lens supports portions 110*a*, 110*b*, and the adjustable angular connectors 120*a* and 120*b*, may together be used to adjust the interpupillary distance and the overall width of the adjustable eyeglasses. If necessary, the bridge bar may also be varied in its length so as to provide for additional fitment options. Furthermore, in embodiments where ridged features 107 are included, the ridged features may be continuous along the entire bridge bar 107, or may be included only in certain areas, such as in two lens support-positioning regions and at the ends. Typically, ridged features 107 are present on the inner portion of the eyeglasses so that the outer portion of the eyeglasses may have a smooth surface for improved aesthetic appearance. However, ridged features may be aligned at any portion of the bridge bar for function with the bridge bar engaging portions of the other pieces being designed accordingly.

The angular connectors 120*a*. 120*b* may be identical or may be two (i.e. left and right) pieces. As described above, the angular connectors 120*a*, 120*b* engage with the bridge bar 105 at its ends by a bar end-engaging portion 122. The angular connectors 120*a*, 120*b* may then provide a temple-engaging portion for receiving temples 130*a*, 130*b* at some pre-defined angle relative to the bridge bar 105. Advantageously, the angular connectors 120*a*, 120*b* have a fixed angle and do not allow for movement of the temples relative to the bridge. This is unlike normal eyeglasses which have folding temples, and the adjustable eyeglasses herein advantageously eliminate movement of the temple relative to the bridge bar for improved security and fitment. Typical eyeglasses require such a movement, or temple hinge, for storage and operability.

The angular connectors 120*a*, 120*b* can be designed with a fixed angle between about 75 degrees to about 105 degrees depending upon desired fitment and aesthetics. In many embodiments, the angular connectors 120*a* and 120*b* will define a fixed angle of about 90 degrees between the bridge bar and the temples 130*a*, 130*b*. Just as with the bridge bar, the temple arms 130*a*, 130*b* may include ridged features engaging with a temple-engaging portion 123 of the angular connectors 120*a*, 120*b*.

It should be appreciated that while the lens supports 110*a* and 110*b* will generally have a bar engaging portion 112 fitting over the bridge bar 105, the bridge bar 105, angular connectors 120*a*, 120*b*, and the temple arms 130*a*, 130*b* may have different means of engagement to form the adjustable eyeglasses. For example, the angular connectors 120*a* and 120*b* are shown each having two female connectors whereas they could alternatively have one male connector and one female connector, or two male connectors, and the temple arms 130*a* and 130*b*, and bridge bar 105 ends could be designed accordingly. Because the lens supports 110*a*. 110*b* generally slide over an end of the bridge bar, if the bridge bar contains a female connector at its end, one or both female connectors could be disengageable from the bridge bar, such as an additional coupling piece. However, in further embodiments, the lens frame portions 110*a*, 110*b*, could designed to lock onto the bridge bar in another manner with female connectors of the bridge bar 105 remaining in place or being of a unitary body with the bridge bar 105.

The individual pieces of exemplary adjustable eyeglasses, as shown assembled in FIGS. 1A-1B, are shown separately in FIGS. 2-5. FIG. 2A-2B show, respectively, front and rear views of an exemplary bridge bar 105. As described herein, the front side of the bridge bar 105 may be smooth 109 whereas the rear side of the bridge bar may include one or more regions containing ridged features 107. In the embodiment of FIG. 2B, the bridge bar contains two regions of ridged features 107 interrupted by a smooth region 109 in the center, although it should be appreciated that the entire bridge bar 105 may contain the ridged features. Likewise, the first end 104*a* and second end 104*b* of the bridge bar do not contain ridged features, but could contain them in various embodiments. Based upon the disclosure, it can be appreciated that various placements of ridged features are contemplated.

FIGS. 3A-3D show front and rear views of a right lens support 110*a* (FIG. 3A, front; FIG. 3B, rear) and a left lens support 110*b* (FIG. 3C, front; FIG. 3B, rear). As described previously, the lens supports 110*a*, 110*b* may each have a bar engagement portion 112 and a lens frame 111. The bar engagement portion 112 and lens frame 111 may be formed together of a unitary body or may be separate pieces which are attached or coupled by any useful means. Furthermore, the lens frame 111 and/or bar engagement portion 112 may be adorned with an aesthetically-appealing coating or cover piece (as can any other visible portion of the adjustable eyeglasses). The lens frame 111 contains several advantages over traditional eyeglasses. For one, the lens frame 111 is round in shape whereas traditional eyeglasses have lenses which may take on various shapes to fit the overall design of they eyeglasses. This means that lenses in traditional eyeglasses are not compatible except for with the specific frames for which they were manufactured to fit. With a round lens shape, one shape of lens can be manufactured for different prescriptions as part of a kit including adjustable eyeglasses and round prescription lenses. In an embodiment, the lenses are spherical. In an embodiment, the lenses are cylindrical. In an embodiment, the lenses are bifocal or trifocal.

Another advantage of the lens frame 111 is that is has a smooth inner surface 113 for circumferentially engaging the lens for a secure but replaceable and adjustable fit. Typical eyeglasses have a retaining notch which is complementary to a ridge manufactured on a glasses lens such that the ridge fits into the notch when the lenses are snapped in place. This means that traditional lenses must also be manufactured to have a set lens depth and cannot be adjusted in any manner once inserted into the lens frame. However, in embodiments herein, the lens may be placed at various positions of depth and rotation for full adjustability of the lens. In alternative embodiments, the lens frame 111 may include a backstop (i.e. a raised lip having a diameter smaller a diameter of the other side) for setting the insertion depth of the lens. At any rate, the smooth inner surface for friction-fitting the lens ensures that lenses of various prescriptions may be fit to the lens frames 111.

In various embodiments, cylindrical lenses may be inserted at certain degrees of rotation for patients having astigmatism or other conditions. In alternative embodiments, the lens frame 111 may support a further, rotatable bezel into which a round lens fits by friction. Rotatable bezels may include angle markings for ease of adjustment. It is contemplated that various combinations of elements are contemplated due to the modular nature of the adjustable eyeglasses, for instance, neither, one, or both of the lens frames may include a rotatable bezel depending upon a patient's needs.

The bar engagement portion 112 may include any means for securing it against a bridge bar. In some embodiments, the bridge bar may exclude any ridged features and the bar engagement portion may slide over the bridge bar being retained only by friction. In further embodiments, the bridge bar 105 includes one or more regions of ridged features 107 for complementary engagement by the bar engagement portion 112. In further embodiments, the bar engagement portion 112 includes an articulating member 115 (alternatively referred to as an articulating flap member 115). In an embodiment, the articulating member 115 includes an internal feature complementary to the ridged features which slides past the ridged features in conjunction with articulation of the articulating member 115. Sliding the bar engagement portion 112 requires some force to move the complementary internal feature of the articulating member 115 past the ridged features 107, in turn articulating the articulating member. Once the desired position of the bar engagement portion 112 is reached, the articulating member 115 holds the internal complementary feature against the ridges to secure it in place. The articulating member 115 may act to partially secure the bar engagement portion 112 in place, and additional securement may be by way of friction between other surfaces of the bar engagement portion and bridge bar 105.

FIGS. 4A-4B depict front (FIG. 4A) and rear (FIG. 4B) views of an angular connector 120. The adjustable eyeglasses may contain two angular connectors which may be the same or different, and for simplicity one angular connector 120 is shown for embodiments where the same angular connector (flipped upside-down) is used at each end of the bridge bar 105. The angular connector 120 includes a bar engagement end 122 and a temple engagement end 123, into which the bridge bar 105 end and temple arm are insertably couplable. In the depicted angular connector, the bar engagement end 122 is shown as being shorter in length than the temple engagement end 123, however in various embodiments the lengths could vary so long as the adjustable eyeglasses remain usable. The bar engagement end 122 may include an articulating member similar to the articulating member of the bar engagement portion(s) 112 of the lens supports for engaging with an end of the bridge bar. Likewise, the bar engagement end 122 may include any other structure or means by which to securely couple it to the bridge bar, including friction fit, complementary features, or other mechanisms. The temple engagement end 123 may also have a similar articulating member or any other mechanism for engaging with a temple arm 130*a*, 130*b*.

Exemplary temple arms are depicted in FIGS. 5A-5D. FIGS. 5A and 5B show, respectively, two side views of exemplary temple arms for the right side of adjustable eyeglasses and FIGS. 5C and 5D show, respectively, two side views of exemplary temple arms for the left side of the adjustable eyeglasses. The temple arms may be set at varying temple lengths, where the temple length is defined by the total length from the front of the eyeglasses to the end of the temple arm. For example, in various embodiments, the temple length may range from about 100 mm to about 170 mm. Various other temple lengths are contemplated, for example from about 50 mm to about 250 mm, or from about 70 mm to about 200 mm, or from about 85 mm to about 180 mm. Various other ranges are contemplated as would be appreciated by a person of skill, and the temple lengths may be adjusted or modified to fit any patient. In the depicted embodiments, the left and right temple arms are mirror images of one another, but in other embodiments they may have varying shapes, sizes, dimensions, etc. For example, for patients having unique needs or requirements (for example, patients having a physical loss of an ear or nontypical car/head shape), various other types of temple arms could be utilized including, but not limited to, straps, deformable temple arms, metal temple arms, etc.

The temple arms 130*a*, 130*b* will generally have a portion fitting behind an ear of a wearer, i.e. an ear retaining end 131, and an insertion end 134. The car retaining end 131 and insertion end 134 are generally connected by a shaft portion 133. On a first side of the temple arms, facing outward from the wearer's head in assembled glasses, the surface may be flat and featureless or may include various other surfaces for aesthetic appearance, texture for appearance or grip, coatings for appearance or grip, etc. On the second side of the temple arms, facing inward toward the wearer's head in assembled glasses, there may be disposed one or more regions of ridged features 137. The ridged features may be complementary to the angular connector temple engagement end 123 for adjustable securement. The overall dimensions of the temple arms 130*a*, 130*b* may be changed in conjunction with one or more other portions of the adjustable eyeglasses for adjusting overall fitment, appearance, and size of the adjustable eyeglasses.

Figure 6:
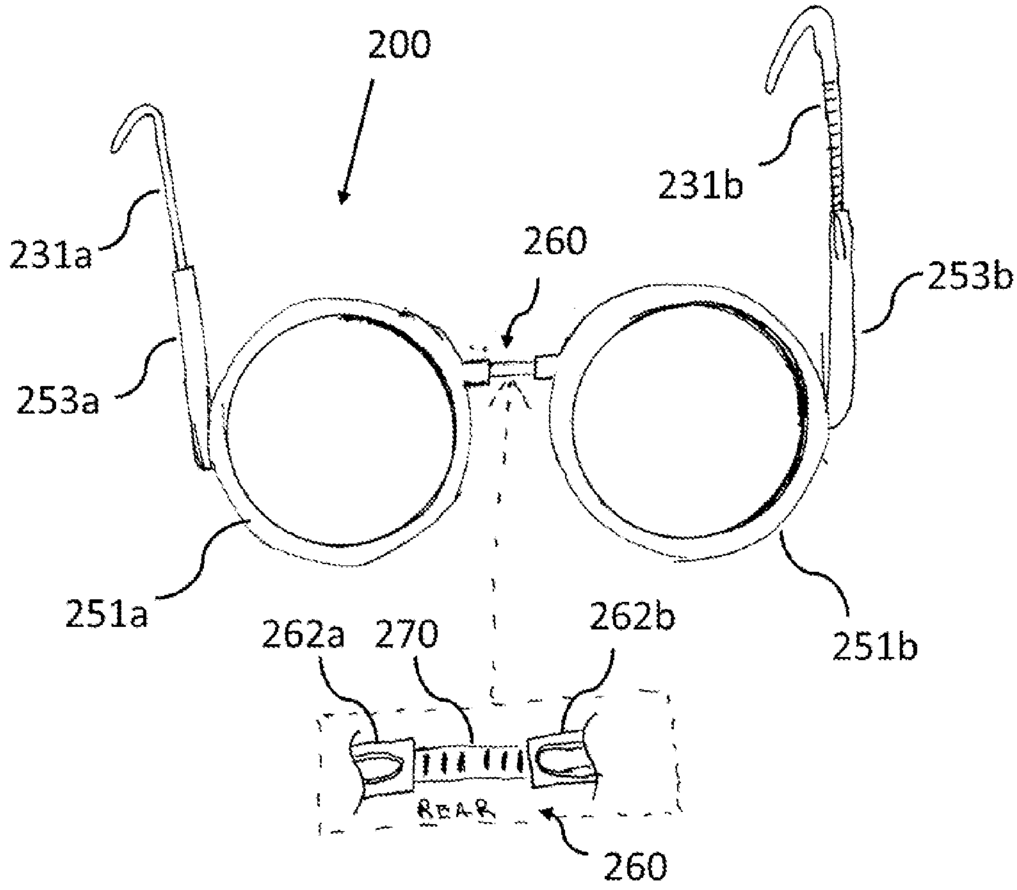
FIG. 6 depicts a front perspective view of a further exemplary adjustable eyeglasses embodiment.

Several alternative embodiments and arrangements are contemplated. For example, in embodiments, adjustable eyeglasses contain five separate pieces by eliminating the angular connectors and attaching temple arm receiving portions directly to lens supports. An exemplary embodiment is depicted in FIG. 6 for adjustable eyeglasses 200 which do not require angular connectors. In the exemplary embodiment 200, the right lens support 251*a* and left lens support 251*b* each include integrated temple arm receiving portions 253*a*, 253*b*. These integrated temple arm receiving portions may be of a unitary body with the lens support, or may be two separate portions coupled together at a fixed angle. Advantageously, the design eliminates a hinge between the temple arm receiving portion and the lens support for the purposes of improved securement on the face of a wearer. In less preferred embodiments, it would be possible to include a hinge, or a hinge limited in its range of motion to stop at a predefined angle to apply retaining pressure on the wearer's head. The integrated temple arm receiving portions 253*a*, 253*b* may receive temple arms (231*a*, 231*b*, respectively) which are adjustably securable by a securing mechanism as described herein (for example, an articulating member of the integrated temple arm receiving portions 253*a*. 253*b* may be utilized in conjunction with one or more regions of ridged features on the temple arms 231*a*, 231*b*, respectively.

While the temple arms may be set at various depths for fitment around the user's cars, the overall width of adjustable eyeglasses 200 and the interpupillary distance may be simultaneously set by a bridge adjustment mechanism 260. The bridge adjustment mechanism 260 is generally any mechanism which connects the right 251*a* and left 251*b* lens frames and allows the two lens supports to move relative to one another. An embodiment of a bridge adjustment mechanism 260 is shown in the dashed inset of FIG. 6. In an embodiment, the bridge adjustment mechanism 260 includes a bridge coupler 270, and bridge coupler receiving portions 262*a* and 262*b* on respective lens supports 251*a* and 251*b*, respectively. The bridge coupler receiving portions 262*a* and 262*b* may include articulating members or another mechanism for adjustable securement with the bride coupler 270, and the bridge coupler 270 may contain ridged features or other features for said adjustable securement. Various alternative bridge adjustment mechanisms are contemplated. For example, the bridge coupler may be permanently attached with one lens support and the other lens support may include a bridge coupler receiving portion. In another embodiment, the bridge coupler may be a female coupler and the lens supports may include male couplers with ridged portions. In yet further embodiments, one lens support may include a female connector releasably couplable with a corresponding male connector on the other lens support. It can be appreciated that integrating the bridge coupler with a lens support permanently reduces the number of separate parts to four rather than five. As with other embodiments, the lens supports 251*a* and 251*b* may have smooth inner surfaces for friction engagement with round lenses.

While the adjustable eyeglasses herein are referred to as having several separate pieces, it can be appreciated that they can be constructed in a manner such that the pieces are adjustable but not separable. Likewise, in various alternative embodiments, the exact positions of adjustable components may be modified so long as the desired adjustability is retained.

Further provided herein are kits including one or more pairs of adjustable eyeglasses, or alternatively a number of components or pieces necessary to build one or more pairs of adjustable eyeglasses, and lenses of various prescriptions. For example, in an embodiment, provided for is a kit including one or more adjustable eyeglasses 100 or 200 or others as described herein, and circular lenses ranging in prescription from about −10 to about +8. Generally, a kit will contain a number of pre-defined prescriptions and will contain at least two lenses at each prescription so that a wearer having two identical prescriptions in their two eyes can be accommodated. The kit will generally contain a range of prescriptions in increments of quarter-diopter (0.25 D). For example, if the prescription range is −10 to +8, the lenses included would have prescription values of (−10, −9.75, −9.5, −9.25, −9.0, −8.75 . . . 6.75, 7.0, 7.25, 7.5, 7.75, 8). Kits may also include instructions for assembly and instructions for inserting lenses.

Further provided for are methods of using adjustable eyeglasses. For example, the adjustable eyeglasses may be assembled, the lenses may be fitted into the lens supports, and the adjustable eyeglasses may be fitted to the wearer's head by one or more adjustments of the adjustable eyeglasses. The adjustments may include one or more of adjustment of the interpupillary distance as described herein, adjustment of the overall width of the eyeglasses, and adjustment of the temple length(s). The eyeglasses may be advantageously adjusted in such a manner that one or more of the adjustments are asymmetric to accommodate wearers with asymmetric facial features. For example, unlike typical eyeglasses, the lens supports and lens frames may be placed at a positions which are not equidistant from a center of the bridge. Methods may further comprise a step of selecting lenses according to a wearer's prescription, and/or a step of examining the wearer to determine their prescription.

EQUIVALENTS AND SCOPE

Those skilled in the art will recognize, or be able to ascertain using no more than routine experimentation, many equivalents to the specific embodiments in accordance with the invention described herein. The scope of the present invention is not intended to be limited to the above Description, but rather is as set forth in the appended claims. Likewise, the claims are not limiting of the scope of the present invention and further claims to aspects of the invention are contemplated.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or the entire group members are present in, employed in, or otherwise relevant to a given product or process.

It is also noted that the term "comprising" is intended to be open and permits but does not require the inclusion of additional elements or steps. When the term "comprising" is used herein, the term "consisting of" is thus also encompassed and disclosed.

Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise.

In addition, it is to be understood that any particular embodiment of the present invention that falls within the prior art may be explicitly excluded from any one or more of the claims. Since such embodiments are deemed to be known to one of ordinary skill in the art, they may be excluded even if the exclusion is not set forth explicitly herein.

It is to be understood that the words which have been used are words of description rather than limitation, and that changes may be made within the purview of the appended claims without departing from the true scope and spirit of the invention in its broader aspects.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. Adjustable eyeglasses, comprising:

a bridge bar comprising an elongate member having first and second ends for receiving a left lens support and a right lens support, the left lens support and right lens support slidably engageable with the bridge bar by a respective bar engagement portion thereof, and wherein a respective bar engagement portion is adjustably positionable along an entire length of the bridge bar, whereby the left lens support and right lens support are independently positionable on the bridge bar to adjustably set an overall lens position and interpupillary distance of the adjustable eyeglasses, with a minimum interpupillary distance corresponding to the left lens support abutting the right lens support;

a left angular connector and a right angular connector, the left angular connector and the right angular connector having a respective bar engagement end and a respective temple engagement end, a respective bar engagement end arranged at a pre-defined angle relative to a respective temple engagement end, wherein a respective bar engagement end is configured and dimensioned to accept an inserted first or second end of the bridge bar, whereby an insertion depth of first and second ends of the bridge bar into the bar engagement ends adjustably sets an overall width of the adjustable eyeglasses;

a left temple arm and a right temple arm respectively comprising an arcuate ear-retaining portion and an insertion portion, wherein a respective temple engagement end of a respective left or right angular connector is configured and dimensioned to accept an inserted insertion portion of a respective left or right temple arm, whereby an insertion depth of respective insertion portions of respective left or right temple arms into respective bar engagement ends adjustably sets left and right temple lengths for the adjustable eyeglasses.

2. The adjustable eyeglasses of claim 1, wherein the left and right lens supports respectively comprise a lens frame portions which is circular and has an inner surface circumferentially engageable with an outer circumference of a circular lens.

3. The adjustable eyeglasses of claim 2, wherein the inner surface of the lens frame portions and outer circumference of the circular lenses are substantially smooth and engage by friction.

4. The adjustable eyeglasses of claim 3, wherein the pre-defined angle is approximately 90 degrees.

5. The adjustable eyeglasses of claim 2, wherein the lens frame portions are independently configured to support lenses, each lens having a prescription in a range from about −10 to +8.

6. The adjustable eyeglasses of claim 1, wherein the bridge bar includes one or more regions of ridged features.

7. The adjustable eyeglasses of claim 6, wherein the bar engagement portions of the left lens support and right lens support respectively include an articulating flap member formed as a portion of the bar engagement portion, the articulating flap members respectively including an interior ridged feature complementary to the one or more regions of ridged features of the bridge bar.

8. The adjustable eyeglasses of claim 7, wherein the complementary feature of the articulating flap member is releasably and adjustably engageable with the one or more regions of ridged features of the bridge bar to releasably secure the respective bar engagement portion at a position along the bridge bar.

9. The adjustable eyeglasses of claim 1, wherein the bar engagement ends of the left angular connector and right angular connector respectively include an articulating flap member formed as a portion of the bar engagement end, the articulating flap members respectively including an interior ridged feature complementary to one or more regions of ridged features disposed on the first and second ends of the bridge bar.

10. The adjustable eyeglasses of claim 9, wherein the complementary feature of the articulating flap member is releasably and adjustably engageable with the one or more regions of ridged features of respective first or second ends of the bridge bar to releasably secure the respective bar engagement end at an insertion depth of a respective first or second end of the bridge bar.

11. The adjustable eyeglasses of claim 1, wherein the temple engagement ends of the left angular connector and right angular connector respectively include an articulating flap member formed as a portion of the temple engagement end, the articulating flap members respectively including an interior ridged feature complementary to one or more regions of ridged features disposed on the insertion ends of the left and right temple arms.

12. The adjustable eyeglasses of claim 11, wherein the complementary feature of the articulating flap member is releasably and adjustably engageable with the one or more ridged features of the temple arms to releasably secure the respective temple engagement end of the respective angular connector at an insertion depth of the temple arm.

13. The adjustable eyeglasses of claim 1, wherein the respective bar engagement end and temple engagement end of each angular connector are arranged at a pre-defined angle of approximately 75-105 degrees.

14. The adjustable eyeglasses of claim 1, wherein the adjustable eyeglasses do not have temple hinges.

15. The adjustable eyeglasses of claim 1, wherein the adjustable eyeglasses do not have nose pads.

16. The adjustable eyeglasses of claim 1, wherein the adjustable eyeglasses are constructed entirely from plastic and contain no metal.

17. The adjustable eyeglasses of claim 1, wherein the left and right temple lengths have a range from about 100 mm to about 170 mm.

18. The adjustable eyeglasses of claim 1, wherein the elongate member comprises a major dimension and a minor dimension in a plane orthogonal to the length dimension of the elongate member.

19. The adjustable eyeglasses of claim 18, wherein a respective bar engagement portion is configured and dimensioned such that major and minor dimensions thereof have a same orientation as major and minor dimensions of the elongate member when the respective bar engagement portion is in slidable engagement with the bridge bar.

20. The adjustable eyeglasses of claim 19, wherein an orientation of a respective lens frame portion with respect to the major dimension of the elongate member is maintained at all positions of the respective bar engagement portion on the bridge bar.

* * * * *